(12) United States Patent
Kim

(10) Patent No.: US 11,656,647 B1
(45) Date of Patent: May 23, 2023

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/878,487

(22) Filed: Aug. 1, 2022

(30) Foreign Application Priority Data

Feb. 25, 2022 (KR) .................. 10-2022-0025292

(51) Int. Cl.
| | | |
|---|---|---|
| *G05G 1/30* | (2008.04) | |
| *G05G 1/40* | (2008.04) | |
| *G05G 1/38* | (2008.04) | |
| *G05G 5/05* | (2006.01) | |
| *G05G 1/44* | (2008.04) | |
| *B60T 7/06* | (2006.01) | |
| *B60K 26/02* | (2006.01) | |
| *G05G 1/01* | (2008.04) | |
| *G05G 25/04* | (2006.01) | |
| *B60T 7/04* | (2006.01) | |

(Continued)

(52) U.S. Cl.
CPC .............. *G05G 1/40* (2013.01); *B60K 26/02* (2013.01); *B60R 21/09* (2013.01); *B60T 7/042* (2013.01); *B60T 7/06* (2013.01); *G05G 1/01* (2013.01); *G05G 1/38* (2013.01); *G05G 1/44* (2013.01); *G05G 5/005* (2013.01); *G05G 5/05* (2013.01); *G05G 25/04* (2013.01); *B60K 2026/026* (2013.01); *G05G 2505/00* (2013.01)

(58) Field of Classification Search
CPC .. G05G 1/01; G05G 1/30; G05G 1/32; G05G 1/34; G05G 1/36; G05G 1/38; G05G 1/40; G05G 1/405; G05G 1/42; G05G 1/44; G05G 1/445; G05G 5/005; G05G 5/03; G05G 5/05; G05G 5/28; G05G 25/04; G05G 2505/00; B60K 26/02; B60K 2026/024; B60K 2026/026; B60T 7/04; B60T 7/042; B60T 7/06; B60T 7/065; B60R 21/09; F16H 19/04

See application file for complete search history.

(56) References Cited

U.S. PATENT DOCUMENTS 10,906,514 B1 * 2/2021 Kim ...................... G05G 5/03
10,946,741 B1 * 3/2021 Kim ...................... B60T 7/06
(Continued)

FOREIGN PATENT DOCUMENTS

| KR | 2017137427 A | * 12/2017 | ............. B60K 26/02 |
|---|---|---|---|
| KR | 10-2021-0125733 A | 10/2021 | |

OTHER PUBLICATIONS

Machine Translation of KR-2017137427-A.*

*Primary Examiner* — Richard W Ridley
*Assistant Examiner* — Brian J McGovern
(74) *Attorney, Agent, or Firm* — Fox Rothschild LLP

(57) ABSTRACT

Provided is a foldable pedal apparatus for a vehicle that is configured such that pedal pads protrude toward a driver to be exposed (pop-up state) such that the pedal pads can be operated by the driver in a manual driving mode in which the driver manually drives, and the pedal pads are hidden not to be exposed to the driver (hidden state) such that the pedal pads cannot be operated by the driver in an autonomous driving situation.

18 Claims, 11 Drawing Sheets

(51) Int. Cl.
*B60R 21/09* (2006.01)
*G05G 5/00* (2006.01)

(56) References Cited

U.S. PATENT DOCUMENTS

| | | | |
|---|---|---|---|
| 11,021,058 B1* | 6/2021 | Kim | G05G 5/28 |
| 11,249,506 B1* | 2/2022 | Kim | G05G 5/28 |
| 11,312,236 B1* | 4/2022 | Kim | B60T 7/065 |
| 11,458,838 B1* | 10/2022 | Kim | B60T 7/06 |
| 11,465,498 B1* | 10/2022 | Kim | B60T 7/06 |
| 2009/0127015 A1* | 5/2009 | Van Saanen | B60T 7/06 |
| | | | 74/513 |
| 2020/0257329 A1* | 8/2020 | Kihara | B60T 7/06 |
| 2020/0262321 A1* | 8/2020 | Masu | B60N 3/063 |
| 2021/0331584 A1* | 10/2021 | Kim | G05G 1/40 |
| 2022/0001843 A1* | 1/2022 | Michael | B60K 26/02 |
| 2022/0011806 A1* | 1/2022 | Miletto | B60T 7/042 |
| 2022/0048384 A1* | 2/2022 | Kim | G05G 5/28 |
| 2023/0001788 A1* | 1/2023 | Hariu | B60K 26/02 |

\* cited by examiner

FOLDABLE PEDAL APPARATUS FOR VEHICLE

CROSS REFERENCE TO RELATED APPLICATION

The present application is based on and claims under 35 U.S.C. § 119(a) the benefit of Korean Patent Application No. 10-2022-0025292, filed Feb. 25, 2022, the entire contents of which is incorporated herein for all purposes by this reference.

TECHNICAL FIELD

The present disclosure relates to a foldable pedal apparatus for a vehicle and, more particularly, to a foldable pedal apparatus for a vehicle of which a pedal pad protrudes toward a driver to be exposed such that the driver can operate the pedal pad in a manual driving mode in which the driver manually drives, and is hidden in the pedal housing not to be exposed to the driver such that the driver cannot operate the pedal pad in an autonomous driving situation.

BACKGROUND

An autonomous vehicle, which is a smart vehicle employing an autonomous technology going to a destination by itself even though a driver does not operate the steering wheel, accelerator pedal, brake, etc., is recently being rapidly developed.

If autonomous driving is generally used, a driver can select a manual driving mode in which the driver manually drives and an autonomous driving mode in which a vehicle goes by itself to a destination without the driver manually driving.

A driver should be able to take a rest in a comfortable position with his/her legs stretched in the self-driving mode. However, if pedals (the accelerator pedal and the brake pedal) disposed in the space under the driver seat keep exposed in the interior, they interfere with the driver taking a rest.

Further, the autonomous driving situation is a situation in which a driver does not operate the pedals (the accelerator pedal and the brake pedal) in the vehicle, but if the driver operates a pedal during autonomous driving, a vehicle control unit determines it is a situation in which the driver wants to stop autonomous driving and manually drive, thereby stopping control for autonomous driving.

However, since the pedals are installed to be exposed in the space under the driver seat in a vehicle, there is a possibility that a driver unconsciously operates the pedals in the autonomous driving situation (misoperation of a pedal), and in this case, there is a possibility of an accident, depending on the road situation, the inter-vehicle distance, or the like.

Therefore, it is required to develop a pedal apparatus that exposes a pedal pad toward a driver such that the driver can operate the pedal pad in the manual driving mode in which the driver manually drives, and that hides the pedal pad such that the driver cannot operate the pedal pad for a comfortable rest and safety such as prevention of misoperation in the autonomous driving situation.

The description provided above as a related art of the present disclosure is just for helping understanding the background of the present disclosure and should not be construed as being included in the related art known by those skilled in the art.

SUMMARY

An objective of the present disclosure is to provide a foldable pedal apparatus for a vehicle in which pedal pads protrude toward a driver to be exposed (pop-up state) such that the pedal pads can be operated by the driver in a manual driving mode in which the driver manually drives, and the pedal pads are hidden not to be exposed to the driver (hidden state) such that the pedal pads cannot be operated by the driver in an autonomous driving situation, thereby enabling the driver to comfortably take a rest in the autonomous driving situation and improving safety by preventing misoperation of the pedals in the autonomous driving situation.

Another objective of the present disclosure is to provide a foldable pedal apparatus that can maximally secure a Power Electronic (PE) room space and an interior space and can contribute to reducing the manufacturing cost and the weight by making the mechanism of foldable pedals as slim and compact as possible.

Another objective of the present disclosure is to provide a foldable pedal apparatus that can maximally improve the interior design of a vehicle by preventing pedal pads from being seen in the interior in a hidden state and can maximize a high-tech image by protruding and popping up the pedal pads from an invisible position.

Another objective of the present disclosure is to provide a foldable pedal apparatus that makes it possible to maximally secure a PE room space in a vehicle by minimizing the space for hiding the pedal apparatus in a hidden state.

Another objective of the present disclosure is to provide a foldable pedal apparatus that can prevent noise and foreign substances from entering an interior and maximally prevent permeation of moisture by minimizing holes that are formed at a footrest panel to be connected with a PE room in order to install and operate the foldable pedal apparatus.

In order to achieve the objectives, a foldable pedal apparatus for a vehicle according to an embodiment of the present disclosure includes: a pedal plate coupled to a footrest panel to be rotatably forward and rearward; a pedal assembly disposed at the pedal plate and configured to generate a signal related to a pedal function when being operated by a driver; and a seat case disposed at the footrest panel and configured to receive the pedal assembly that is inserted therein when the pedal plate is rotated forward, in which when the pedal plate is rotated forward and the pedal assembly is inserted in the seat case, a hidden state in which the driver cannot operate the pedal assembly is entered in an autonomous driving situation, and when the pedal plate is rotated rearward and the pedal assembly protrudes toward the driver, a pop-up state in which the driver can operate the pedal assembly is entered in a manual driving situation.

In some embodiments, the foldable pedal apparatus may further includes: a rotary motor fixed to the footrest panel; and a rotation shaft disposed through an end of the pedal plate with both ends rotatably coupled to the footrest panel, in which a driving gear may be coupled to the rotary motor and a driven gear engaged with the driving gear may be fitted on the rotation shaft, so when the rotary motor is operated, the pedal plate and the rotation shaft may be rotated with respect to the footrest panel.

In some embodiments, the pedal plate, the seat case, and the rotary motor may be disposed on an inclined front surface of the footrest panel, and the seat case may be positioned over the rotation shaft.

In some embodiments, the pedal assembly may include two pedal assemblies that are the same in configuration and spaced left and right apart from each other on a surface of the pedal plate.

In some embodiments, any one of the two pedal assemblies spaced left and right apart from each other on the pedal plate may be used as an accelerator pedal apparatus and the other one may be used as a brake pedal apparatus.

In some embodiments, the seat case may be composed of a first case and a second case that are separated from each other and in which the pedal assembly of the accelerator pedal apparatus and the pedal assembly of the brake pedal apparatus are inserted, respectively.

In some embodiments, the pedal assembly may include: a pedal housing protruding from a surface of the pedal plate; a pedal pad rotatably coupled to the pedal housing at a lower end thereof through a hinge pin and configured to rotate around the hinge pin when being operated by a driver; and a return spring having both ends supported by the pedal housing and the pedal pad, respectively, and configured to provide elasticity to the pedal pad so that the pedal pad protrudes from the pedal housing.

In some embodiments, the foldable pedal apparatus may further include: a permanent magnet coupled to the pedal pad to face the pedal housing; and a PCB coupled to the pedal housing to face the permanent magnet, in which the PCB may recognize a variation of magnetic flux of the permanent magnet and generate a signal related to a pedal function when the pedal pad is rotated.

In some embodiments, when a rotary motor is rotated and the pedal plate is rotated rearward, the pedal assembly may enter a pop-up state in which the pedal assembly is exposed toward a driver, and when the pedal pad is rotated by a driver without the rotary motor in operation and a position of the permanent magnet is changed, the PCB may generate a signal related to a pedal function.

In some embodiments, a stopper may protrude at a lower end of the pedal pad; and the stopper may be in contact with the pedal housing in an initial state in which a driver does not operate the pedal pad with the pedal assembly in the pop-up state, so an initial position of the pedal pad may be maintained.

In some embodiments, when a driver depresses the pedal pad with the pedal assembly in the pop-up state, a protrusion of the pedal housing may come in contact with an inner side of the pedal pad, so a full stroke position of the pedal pad may be maintained.

In some embodiments, the foldable pedal apparatus may further include a cover member made of an elastic material, positioned at an entrance of the seat case, and coupled to the footrest panel at an end, in which, in a hiding operation of inserting the pedal assembly into the seat case, the cover member may be pressed to be bent into the seat case by the pedal assembly, and in a pop-up operation of taking the pedal assembly out of the seat case, the cover member may return into an initial shape and block the entrance of the seat case, thereby preventing foreign substances from entering the seat case.

In some embodiments, the cover member may be coupled like a cantilever of which an end is coupled to the footrest panel and a lower end is rotated forward and rearward.

In some embodiments, the cover member may be any one of an elastic steel plate and an elastic plastic plate that is formed in the same shape as a cross-section of the entrance of the seat case.

In some embodiments, a panel hole through which a driven gear is inserted may be formed through the front surface of the footrest panel.

In some embodiments, the foldable pedal apparatus for a vehicle according to the present disclosure is configured such that pedal pads protrude toward a driver to be exposed (pop-up state) such that the pedal pads can be operated by the driver in a manual driving mode in which the driver manually drives, and the pedal pads are hidden not to be exposed to the driver (hidden state) such that the pedal pads cannot be operated by the driver in an autonomous driving situation, whereby there is an effect of enabling the driver to comfortably take a rest in the autonomous driving situation and improving safety by preventing misoperation of the pedals in the autonomous driving situation.

Further, in some embodiments, there is an effect that the foldable pedal apparatus can maximally secure a PE room space and an interior space and can contribute to reducing the manufacturing cost and the weight by making the mechanism of foldable pedals as slim and compact as possible.

Further, in some embodiments, there is an effect that the foldable pedal apparatus according to the present disclosure can maximally improve the interior design of a vehicle by preventing pedal pads from being seen in the interior in a hidden state and can maximize a high-tech image by protruding and popping up the pedal pads from an invisible position.

Further, in some embodiments, there is an effect that the foldable pedal apparatus can prevent noise and foreign substances from entering an interior and maximally prevent permeation of moisture by minimizing holes that are formed in the footrest panel to be connected with a PE room in order to install and operate the foldable pedal apparatus.

As discussed, the method and system suitably include use of a controller or processor.

In another embodiment, vehicles are provided that comprise an apparatus as disclosed herein.

In a fully autonomous vehicle or system, the vehicle may perform all driving tasks under all conditions and little or no driving assistance is required from a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Figure 1:
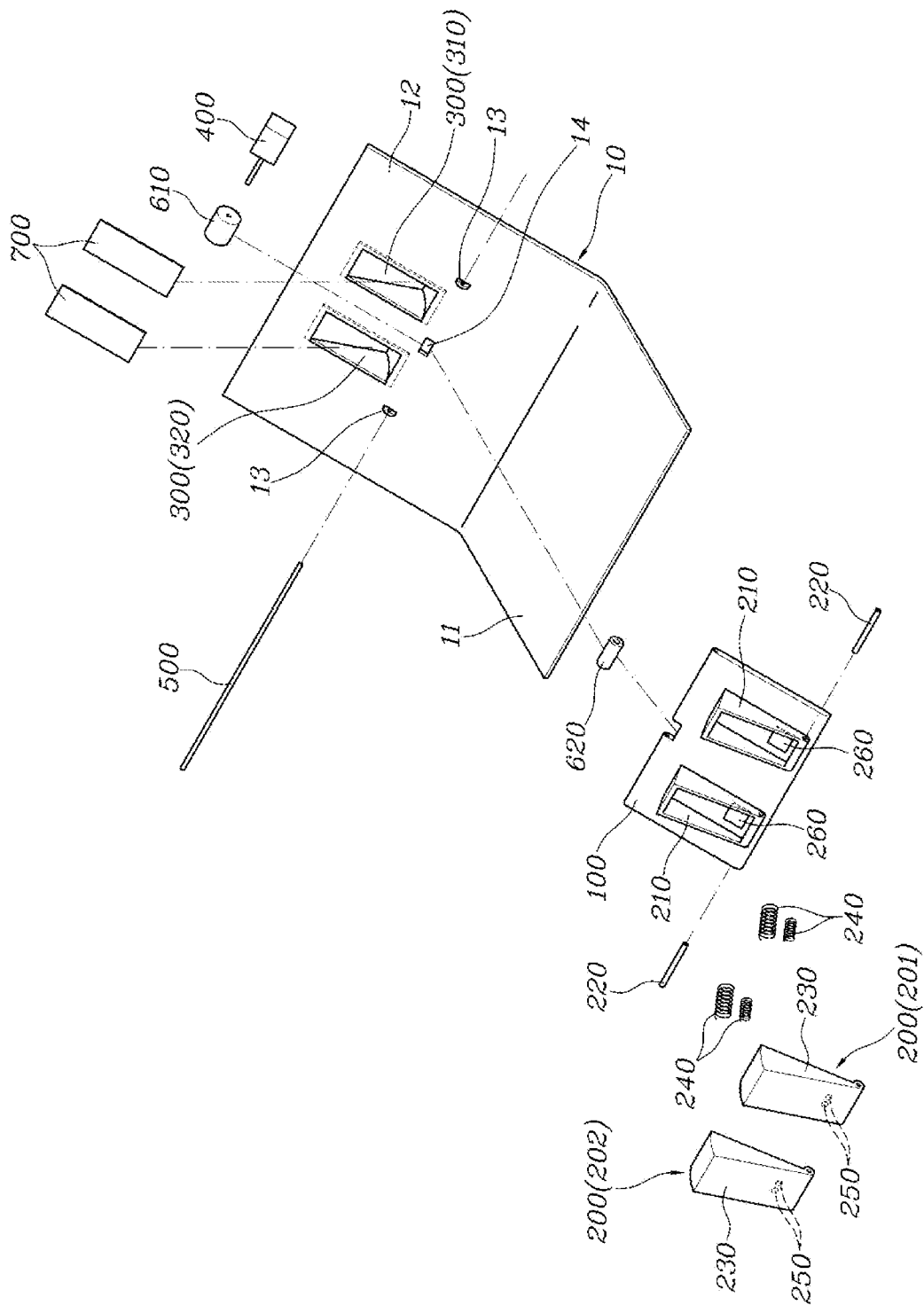
FIG. 1 is an exploded view of a foldable pedal apparatus according to an embodiment of the present disclosure.

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all modifications, equivalents, and substitutions are included in the scope and spirit of the present disclosure.

It will be understood that, although the terms first, second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Terms used in the present disclosure are used only in order to describe specific exemplary embodiments rather than limiting the present disclosure. Singular forms are intended to include plural forms unless the context clearly indicates otherwise. It will be further understood that the terms "comprises" or "have" used in this specification specify the presence of stated features, numerals, steps, operations, components, parts, or a combination thereof, but do not preclude the presence or addition of one or more other features, numerals, steps, operations, components, parts, or a combination thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control unit (controller) according to exemplary embodiments of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

A foldable pedal apparatus for a vehicle according to an exemplary embodiment of the present disclosure is described hereafter in detail with reference to the accompanying drawings.

A foldable pedal apparatus for a vehicle according the present disclosure, as shown in FIGS. 1 to 11, may include: a pedal plate 100 coupled to a footrest panel 10 to be rotatable forward and rearward; pedal assemblies 200 disposed at the pedal plate 100 and generating a signal related to a pedal function when being operated by a driver; and seat cases 300 disposed at the footrest panel 10 and receiving the pedal assemblies 200 that are inserted therein when the pedal plate 100 is rotated forward.

The footrest panel 10 may include a base surface 11 and an inclined front surface 12 extending forward and upward from the base surface 11.

The seat cases 300, which are components having spaces in which the pedal assemblies 200 can be accommodated, may be integrally formed with the footrest panel 10 or may be formed as a separate part and then combined with the footrest panel 10.

The seat cases 300 may protrude forward from the footrest panel 10 and the front side of the footrest panel 10 may be a Power Electronics (PE) room space of an electric vehicle.

Figure 2:
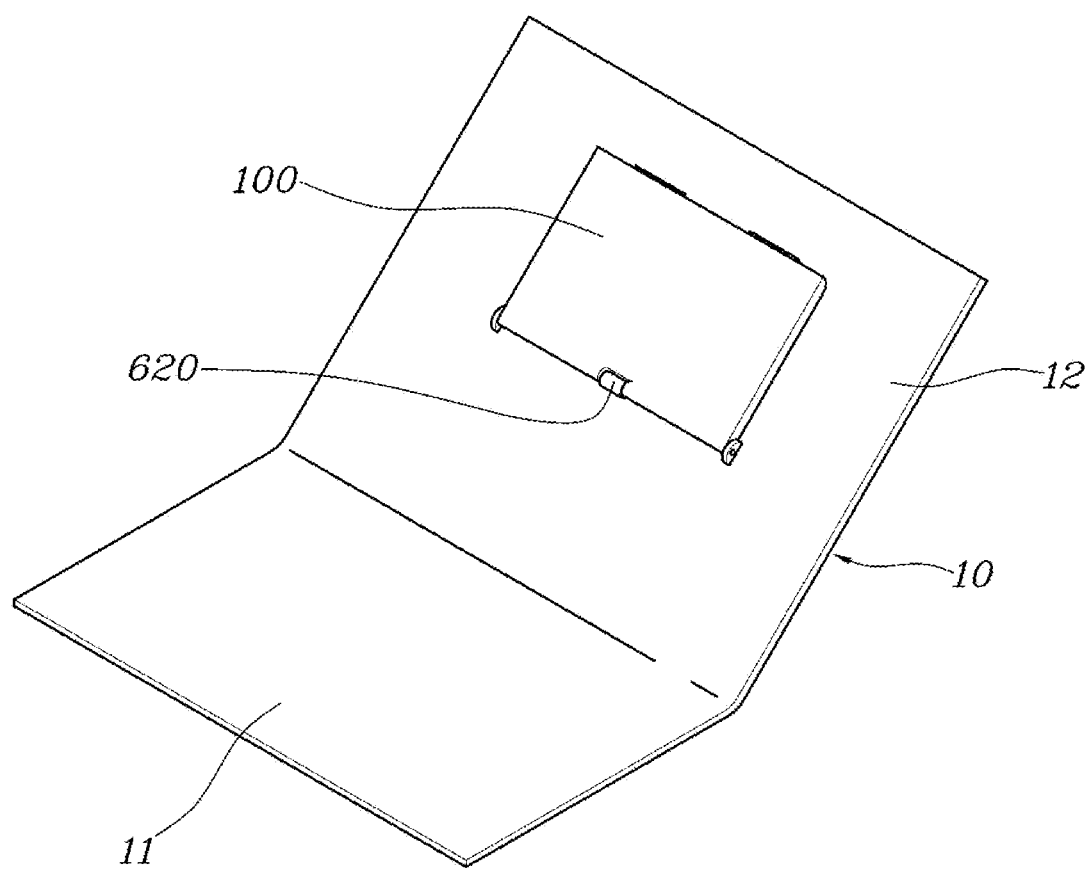
FIG. 2 is an assembly view of FIG. 1 in which pedal pads have been hidden.
Figure 3:
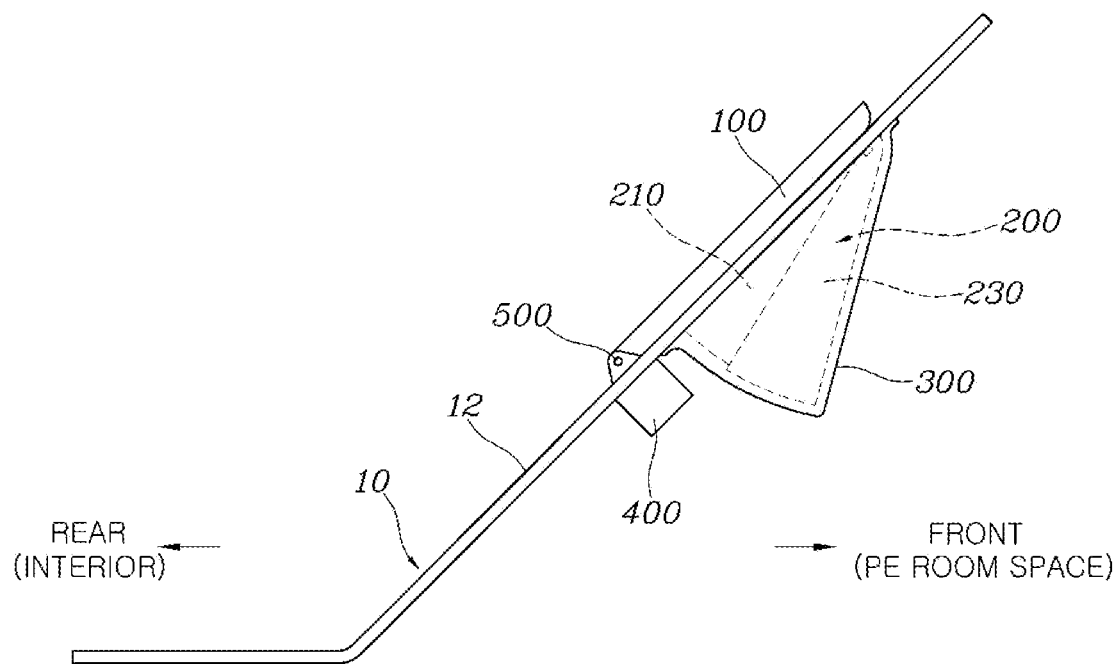
FIG. 3 is a side view of FIG. 2.
Figure 4:
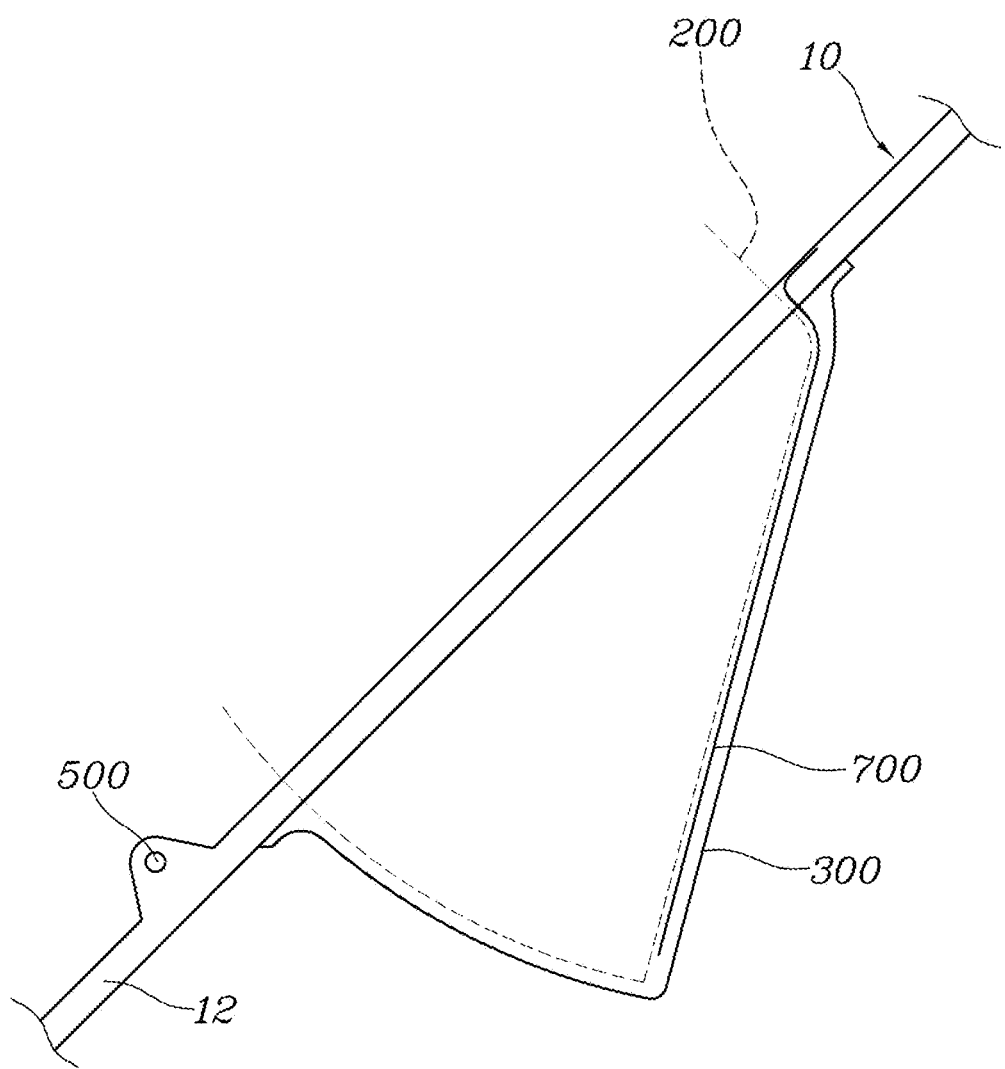
FIG. 4 is a view illustrating cover members with pedal pads hidden.
Figure 5:
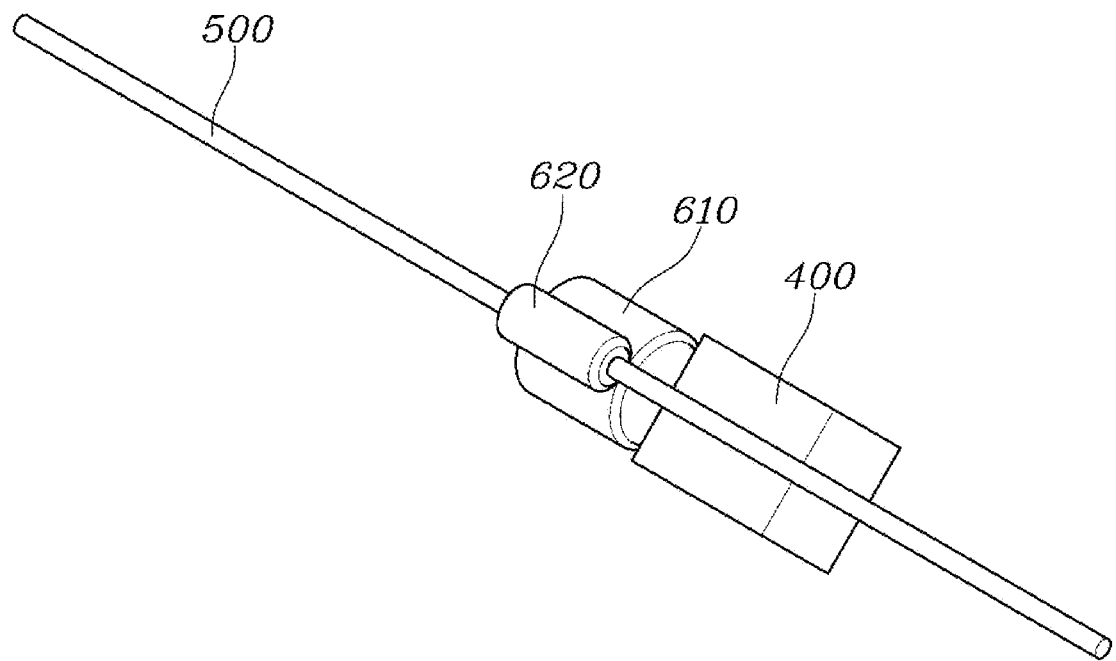
FIG. 5 is a view illustrating an engagement state of a driving gear and a driven gear according to the present disclosure.
Figure 6:
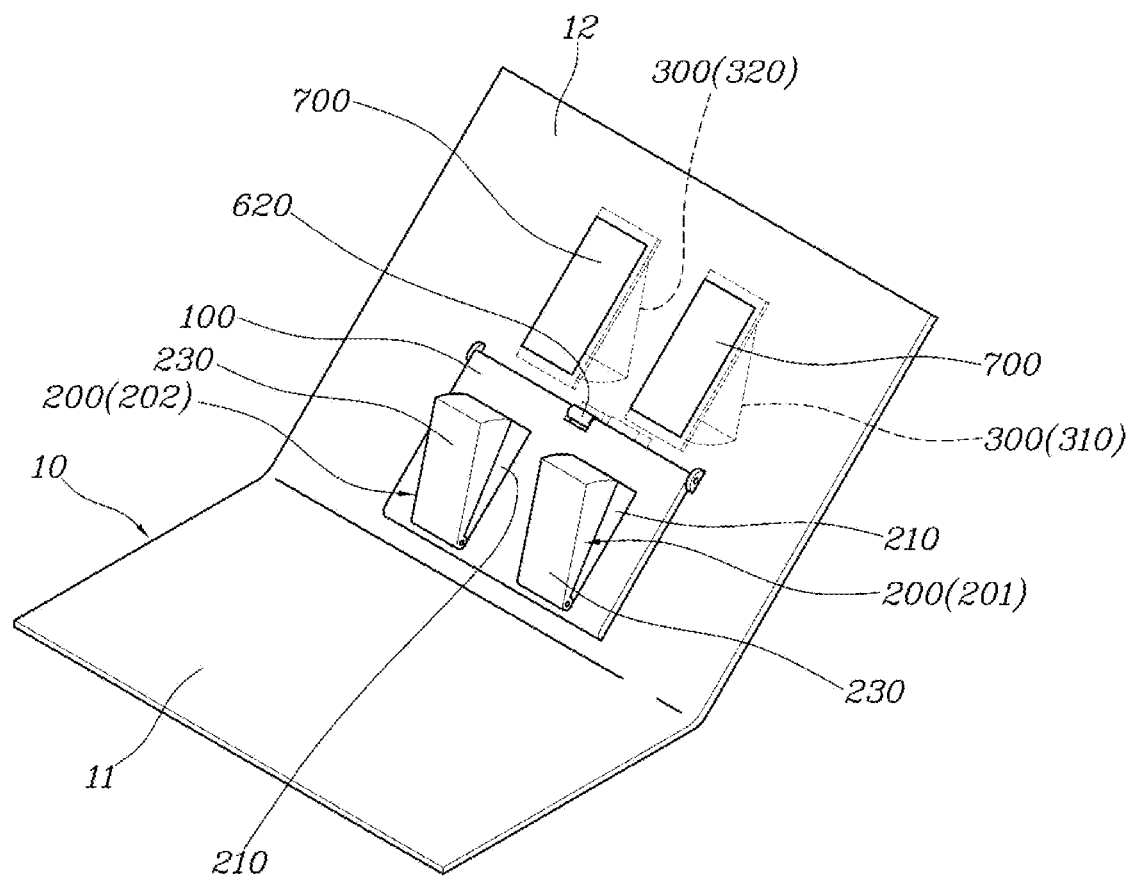
FIG. 6 is a view showing the state in which pedal pads have popped up in FIG. 2.
Figure 7:
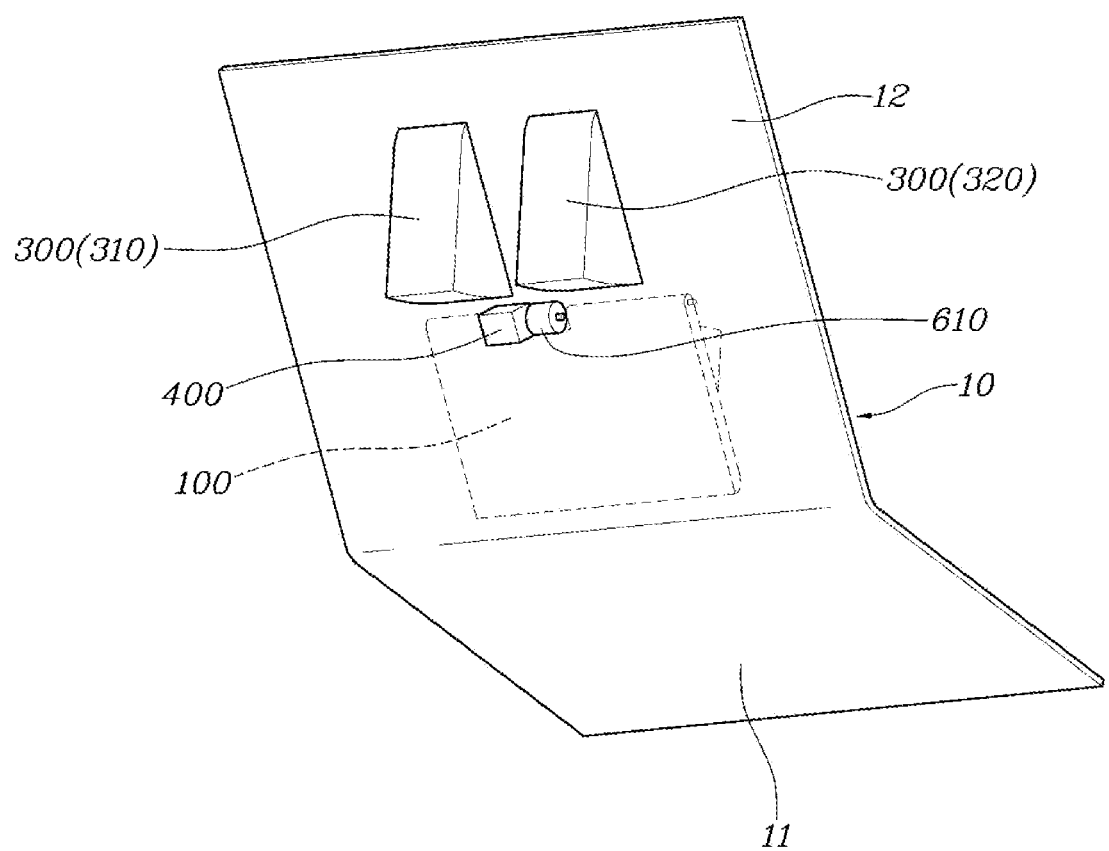
FIG. 7 is a view of FIG. 6 seen from the front.
Figure 8:
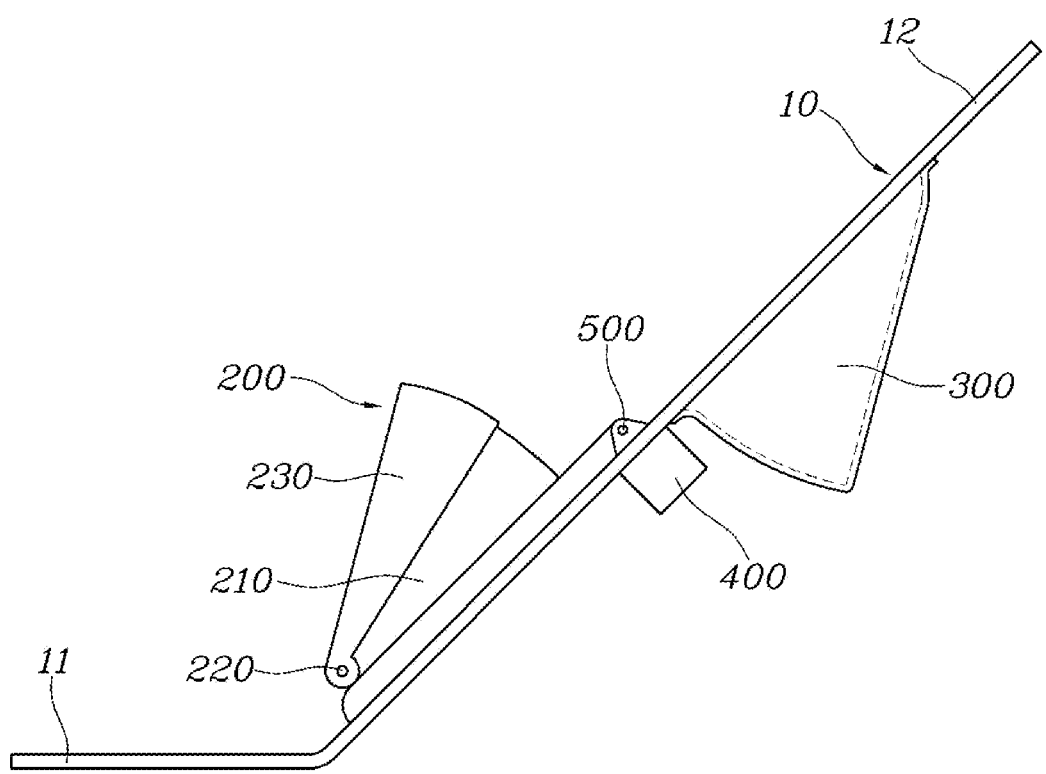
FIG. 8 is a side view of FIG. 6.

In an autonomous driving situation, when the pedal plate 100 is rotated forward, the pedal assemblies 200 may be inserted into the seat cases 300, and accordingly, the pedal assemblies 200 may enter a hidden state in which a driver cannot operate the pedal assemblies 200 (see FIGS. 2 to 4).

In a manual driving mode, when the pedal plate 100 is rotated rearward, the pedal assemblies 200 may protrude into the interior in which a driver is, and accordingly, the pedal assemblies 200 may enter a pop-up state in which the driver can operate the pedal assemblies 200 (see FIGS. 6 to 9).

In an electric vehicle, the front side of the footrest panel 10 may be a PE room space in which PE parts are positioned, and the rear side of the footrest panel 10 may be an interior in which a driver is positioned.

According to the foldable pedal apparatus of the present disclosure, the pedal plate 100 may be rotated forward by a rotary motor (actuator) to be described below, whereby when the pedal assemblies 200 on the pedal plate 100 are inserted into the seat cases 300, the pedal assemblies 200 are maintained in a hidden state in which a driver cannot operate the pedal assemblies 200.

When the pedal assemblies 200 enter the hidden state, the pedal assemblies 200 may be positioned in the PE room space, so the pedal assemblies 200 are not exposed to the visual field of a driver or passengers, whereby there is an advantage that the interior design of a vehicle can be maximally improved.

Further, according to the present disclosure, the space for hiding the pedal assemblies 200 in the hidden state can be minimized, so there is an advantage that it is possible to maximally secure the interior and the PE room space of a vehicle.

According to the foldable pedal apparatus of the present disclosure, the pedal plate 100 may be rotated forward by a rotary motor (actuator) to be described below, whereby when the pedal assemblies 200 on the pedal plate 100 protrude into the interior of a vehicle, the pedal assemblies 200 are exposed toward a driver and enter a pop-up state in which a driver can operate the pedal assemblies 200.

When the pedal assemblies 200 in the hidden state pop up, the pedal assemblies 200 may come out of the seat cases 300 to be exposed into the interior where a driver is, so there is an advantage that a high-tech image can be maximized.

The foldable pedal apparatus according to the present disclosure may include a rotary motor 400 fixed to the footrest panel 10, and a rotation shaft 500 disposed through an end of the pedal plate 100 with both ends rotatably coupled to the footrest panel 10.

The rotary motor 400 may be an actuator providing power to rotate the pedal plate 100, can rotate both clockwise and counterclockwise, and is fixed to the front surface 12 of the footrest panel 10.

The operation of the rotary motor 400 may be controlled by a PCB to be described below.

The rotation shaft 500 may be integrally coupled to the pedal plate 100 while passing through an end of the pedal plate 100, and both ends of the rotation shaft 500 passing through the pedal plate 100 may be rotatably coupled in projections 13 on the front surface 12 of the footrest panel 10.

A driving gear 610 may be fitted on a motor shaft of the rotary motor 400, and a driven gear 620 engaged with the driving gear 610 may be fitted on the rotation shaft 500. Accordingly, power of the rotary motor 400 may be transmitted to the rotation shaft 500 through the driving gear 610 and the driven gear 620, and the pedal plate 100 with the pedal assemblies 200 may be rotated forward and rearward with respect to the footrest panel 10.

A panel hole 14 through which the driven gear 620 is inserted may be formed through the front surface 12 of the footrest panel 10.

That is, according to an embodiment of the present disclosure, since only the panel hole 14 for installing the driven gear 620 is formed, it is possible to minimize holes formed at the footrest panel 10 and connected with a PE room, so it is possible to prevent noise and foreign substances from entering an interior and to maximally prevent permeation of moisture.

According to the foldable pedal apparatus of the present disclosure, when the rotary motor 400 is operated, the pedal plate 100 may be rotated forward and the pedal assemblies 200 are hidden, or the pedal plate 100 may be rotated rearward and the pedal assemblies 200 pop up. To this end, the pedal plate 100, the seat cases 300, and the rotary motor 400 may be disposed on the inclined front surface 12 of the footrest panel 10 and the seat cases 300 are positioned over the rotation shaft 500.

The foldable pedal apparatus according to the present disclosure may have two pedal assemblies 200 of which the entire configurations are the same and the two pedal assemblies 200 are disposed to be spaced left and right apart from each other on the pedal plate 100. Any one of the two pedal assemblies 200 disposed to be spaced apart left and right from each other on the pedal plate 100 is used as a pedal assembly of an accelerator pedal apparatus 201 and the other one is used as a pedal assembly of a brake pedal apparatus 202.

The seat cases 300 on the front surface 12 of the footrest panel 10 may be formed in U-shaped cross-sectional shapes to have spaces in which the pedal assemblies 200 can be inserted, and openings thereof are connected with the front surface 12 of the footrest panel 10.

The seat cases 300 may be composed of a first case 310 and a second case 320 that are separated and in which the pedal assembly of the accelerator pedal apparatus 201 the pedal assembly of the brake pedal apparatus 202 are inserted, respectively, or may be formed as one space by integrating the first case 310 and the second case 320.

The pedal assemblies 200 according to the present disclosure each may include: a pedal housing 210 protruding from a surface of the pedal plate 100; a pedal pad 230 rotatably coupled to the pedal housing 210 at the lower end thereof through a hinge pin 220 and rotating around the hinge pin 220 when being operated by a driver; and a return spring 240 having both ends supported by the pedal housing 210 and the pedal pad 230, respectively, and providing elasticity to the pedal pad 230 so that the pedal pad 230 protrudes from the pedal housing 210.

The pedal housing 210 may be integrally formed with the pedal plate 100 or may be formed as a separate part and then combined with the pedal plate 100.

The pedal housing 210 may be formed in a U-shaped cross-sectional shape together with the pedal plate 100 and an opening of the pedal housing 210 faces the pedal pad 230.

The lower end of the pedal pad 230 may be rotatably coupled to the pedal housing 210 through the hinge pin 220.

The return spring 240 may be disposed such that one end is supported by the pedal housing 210 and another end is supported by the pedal pad 230, thereby providing elasticity to the pedal pad 230 so that the pedal pad 230 protrudes from the pedal housing 210.

The return spring 240 may be a part disposed inside the assembly of the pedal housing 210 and the pedal pad 230, so an efficient layout structure can be achieved. Accordingly, it is possible to reduce the size of the assembly of the pedal housing 210 and the pedal pad 230 and the external size of the entire pedal apparatus.

It is possible to tune a pedal effort by tuning the spring force of the return spring 240, particularly, the return spring 240 may be a dual spring having different spring forces to be able to suppress fine vibration of the pedal pad 230, and a compression coil spring may be used.

The pedal assemblies 200 according to the present disclosure each may further include a permanent magnet 250 coupled to the pedal pad 230 to face the pedal housing 210, and a Printed Circuit Board (PCB) 260 fixed to the pedal housing 210 to face the permanent magnet 250. The PCB 260 recognizes a variation of magnetic flux of the permanent magnet 250 and generates a signal related to a pedal function when the pedal pad 230 is rotated, and the signal related to a pedal function is a signal related to braking or a signal related to acceleration.

The PCB 260 may have also a function of controlling the operation of the rotary motor 400. To this end, the PCB 260 and the rotary motor 400 may be electrically connected to be able to transmit/receive a signal and the rotary motor 400 is electrically connected with a power device for operation.

FIGS. 2 to 4 show a hidden state in which the pedal assemblies 200 are inserted in the seat cases 300 not to be exposed toward a driver.

When the rotary motor 400 is operated and the pedal plate 100 with the rotation shaft 500 is rotated forward, the pedal assemblies 200 on the pedal plate 100 may be inserted into the seat cases 300 on the front surface 12 of the footrest panel 10, whereby the pedal assemblies 200 including the pedal pads 230 are positioned in the PE room space with respect to the footrest panel 10 and enter the hidden state in which a driver cannot operate the pedal assemblies 200.

When the pedal assemblies 200 are in the hidden state, a wide space that may not be interfered with by pedals is secured under and ahead of a driver seat, so a driver can take a rest in a comfortable position in a relax mode. Further, misoperation of the pedals during autonomous driving is prevented, so it is possible to improve safety.

FIGS. 6 to 9 show a pop-up state in which the pedal assemblies 200 have protrudes toward an interior to be exposed toward a driver.

When the rotary motor 400 is operated and the pedal plate 100 with the rotation shaft 500 is rotated rearward in the hidden state, the pedal assemblies 200 on the pedal plate 100 may come out of the seat cases 300 and protrude into the interior, where a driver is, to be exposed, whereby the pedal assemblies 200 with the pedal pads 230 enter a pop-up state in which the driver can operate the pedal assemblies 200.

As described above, when the rotary motor 400 is operated, the pedal plate 100 is rotated, and the pedal assemblies 200 with the pedal pads 230 enter the hidden state or the pop-up state, the PCBs 260 may not generate a signal related to a pedal function to prevent misoperation.

Figure 10:
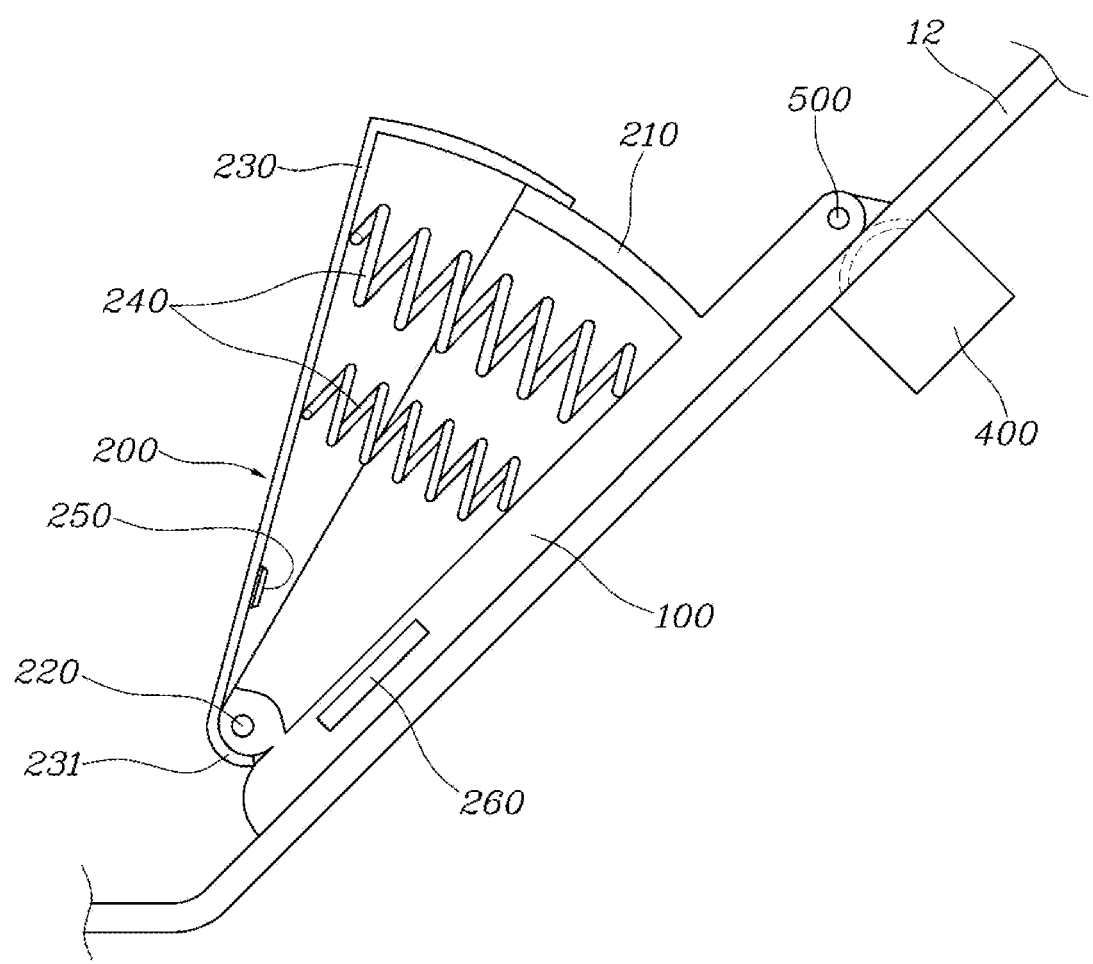
FIG. 10 is a view showing an initial state in which a driver does not operate pedal pads that have popped up.
Figure 11:
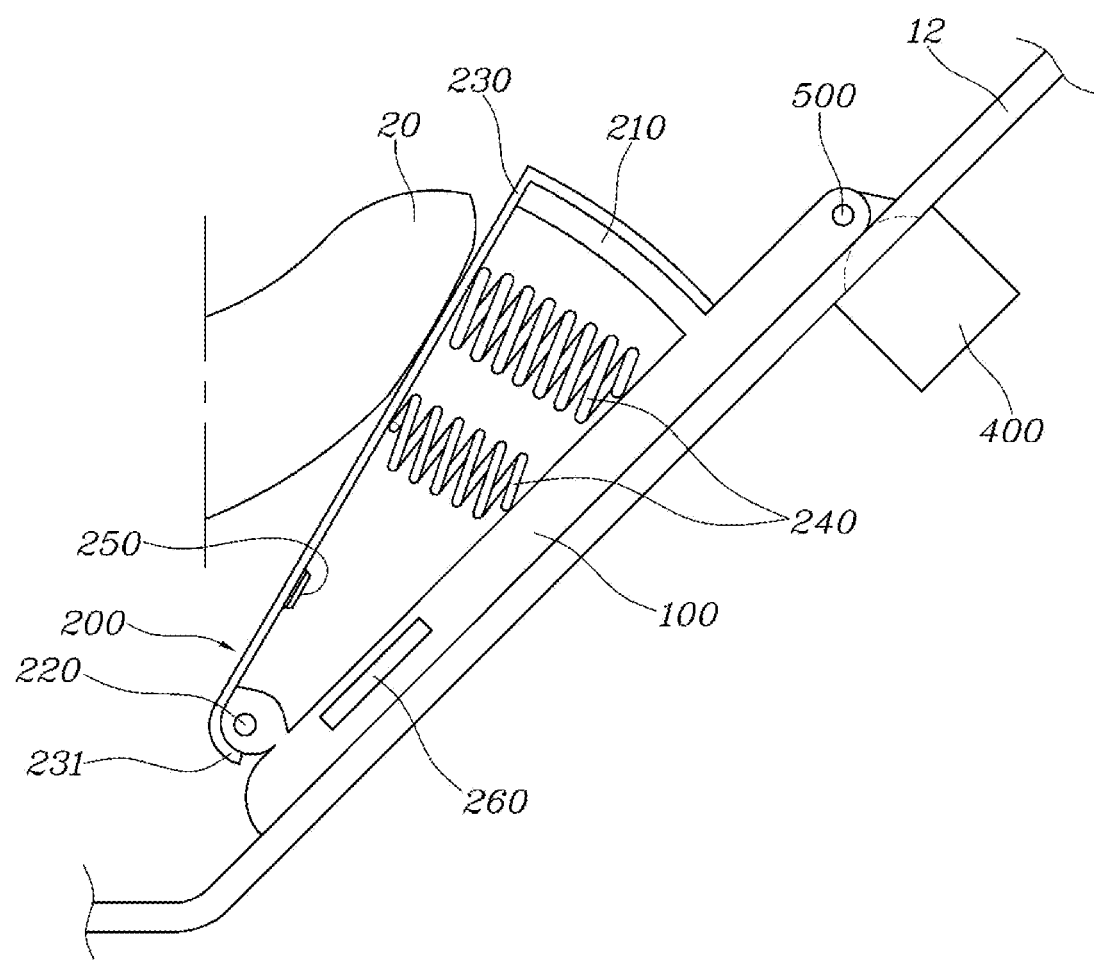
FIG. 11 is a view showing the state in which a popped-up pedal pad has been rotated forward by a driver depressing the pedal pad with a foot.

FIG. 10 shows an initial state in which a driver does not operate the pedal pads 230 with the pedal assemblies 200 having the pedal pads 230 popped up, and FIG. 11 shows a normal operation state in which a popped-up pedal pad 230 has been rotated forward by a driver depressing the pedal pad 230 with a foot 20.

As shown in FIG. 10, in the initial state in which a driver does not operate the pedal pads 230 with the pedal assemblies 200 popped up, stoppers 231 at the lower ends of the pedal pad 230 is supported in contact with the lower ends of the pedal housing 210 to which the hinge pins 220 are coupled, so the initial positions of the pedal pads 230 are maintained.

When a driver depresses a pedal pad 230 in the initial state shown in FIG. 10, the pedal pad 230 may be rotated forward around a hinge pin 220, as shown in FIG. 11. In this process, the position of a permanent magnet 250 may be changed, a PCB 260 may recognize a variation of magnetic flux due to the position change of the permanent magnet 250 and generate a signal related to a pedal function (a function related to acceleration or a signal related to braking), whereby it is possible to expect more stable operation.

When the pedal pads 230 are rotated forward by a driver, the return springs 240 may be compressed and a pedal effort may be generated. When the pedal pads 230 are maximally rotated, protrusions of the pedal housings 210 may come in contact with the inner sides of the pedal pads 230, where the full stroke positions of the pedal pads 230 are maintained.

An embodiment of the present disclosure further includes cover members 700 made of an elastic material, positioned at the entrances of the seat cases 300, and each having an end coupled to the footrest panel 10.

When the cover members 700 are positioned to cover the entrances of the seat cases 300, cover members 700 may be coupled like cantilevers such that the upper ends of the cover members 700 are coupled to the front surface 12 of the footrest panel 10 and the lower ends thereof are rotated forward and rearward.

Accordingly, in a hiding operation of inserting the pedal assemblies 200 with the pedal pads 230 into the seat cases 300, the cover members 700 may be pressed to be bent into the seat cases 300 by the pedal assemblies 200.

Figure 9:
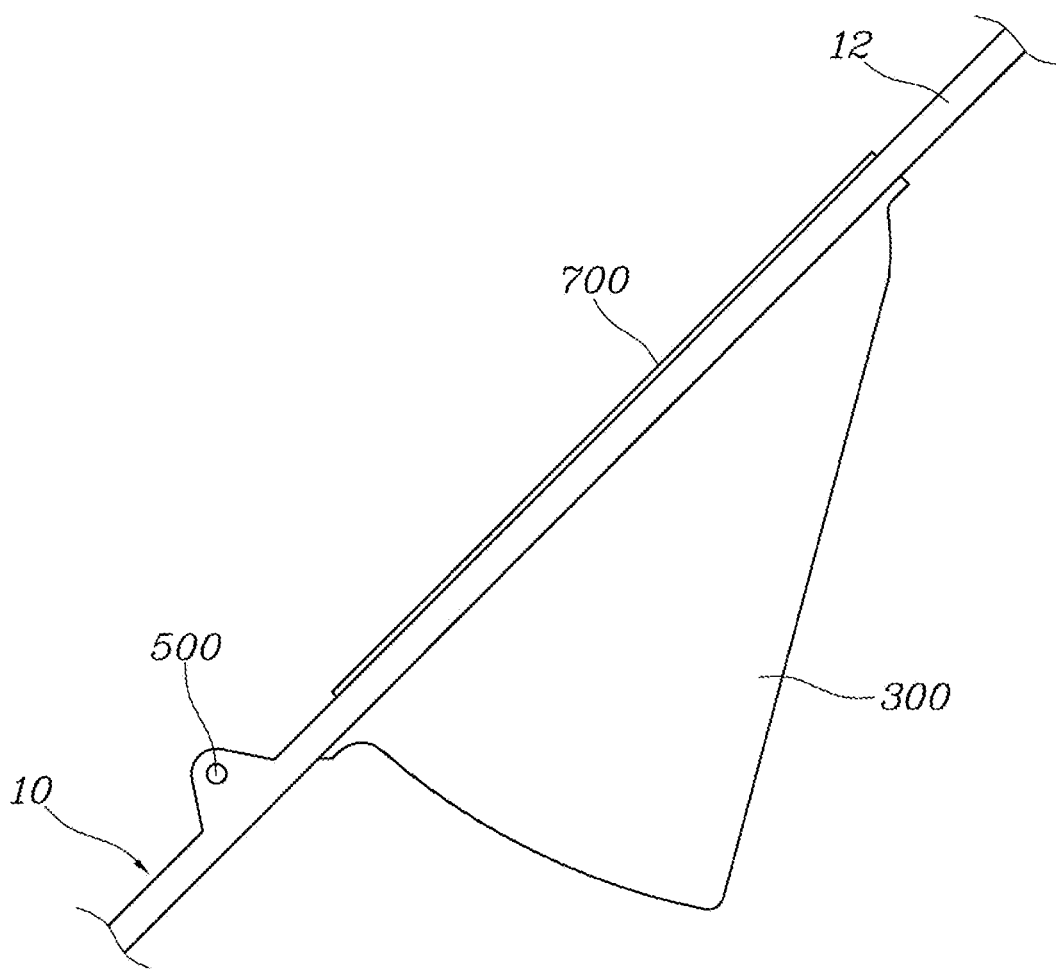
FIG. 9 is a view illustrating a cover member pedal pads popped up.

In the pop-up operation of taking the pedal assemblies 200 with the pedal pads 230 out of the seat cases 300, as shown in FIG. 9, the cover members 700 may return into the initial panel shapes and block the entrances of the seat cases 300, so it is possible to prevent foreign substances from entering the seat cases 300.

The cover members 700 made of an elastic member may be any one of elastic steel plates and elastic plastic plates formed in the same shape as the cross-sections of the entrances of the seat cases 300, or may be covers made of an elastic fiber such as nylon.

As described above, the foldable pedal apparatus for a vehicle may be configured such that the pedal pads 230 protrude toward a driver to be exposed (pop-up state) such that the pedal pads can be operated by the driver in a manual driving mode in which the driver manually drives, and the pedal pads 230 are hidden not to be exposed to the driver (hidden state) such that the pedal pads cannot be operated by the driver in an autonomous driving situation, whereby there is an advantage that a driver can comfortably take a rest in the autonomous driving situation and it is possible to improve safety by preventing misoperation of pedals in the autonomous driving situation.

Further, there is an advantage that the foldable pedal apparatus may maximally secure a PE room space and an interior space and contribute to reducing the manufacturing cost and the weight by making the mechanism of foldable pedals as slim and compact as possible.

Further, there is an advantage that the foldable pedal apparatus may maximally improve the interior design of a vehicle by preventing the pedal pads 230 from being seen in the interior in a hidden state and maximize a high-tech image by protruding and popping up the pedal pads 230 from an invisible position.

Further, there is an advantage that the foldable pedal apparatus may prevent noise and foreign substances from entering an interior and maximally prevent permeation of moisture by minimizing holes that are formed in the footrest panel 10 to be connected with a PE room in order to install and operate the foldable pedal apparatus.

Although the present disclosure was described with reference to specific embodiments shown in the drawings, it is apparent to those skilled in the art that the present disclosure may be changed and modified in various ways without departing from the scope of the present disclosure which is described in the following claims.

What is claimed is:

1. A foldable pedal apparatus of a vehicle including an autonomous driving mode and a manual driving mode, the foldable pedal apparatus comprising:
    a pedal plate coupled to a footrest panel to be rotatable forward and rearward;
    a pedal assembly disposed at the pedal plate and configured to be rotatable with the pedal plate between a hidden state during the autonomous driving m ode and a pop-up state during the manual driving mode, the pedal assembly configured to generate a signal related to a pedal function when being operated by a driver; and
    a seat case disposed at the footrest panel and configured to receive the pedal assembly inserted into the seat case when the pedal plate is rotated forward and the pedal assembly reaches the hidden state during the autonomous driving mode,
    a rotation shaft disposed through an end of the pedal plate with opposed ends rotatably coupled to the footrest panel;
    when the vehicle is in the manual driving mode and the pedal assembly is in the pop-up state, the rotation shaft is disposed above the pedal assembly and between the pedal assembly and the seat case.

2. The foldable pedal apparatus of claim 1, further comprising:
    a rotary motor fixed to the footrest panel; and
    wherein a driving gear is coupled to the rotary motor and a driven gear engaged with the driving gear is fitted on the rotation shaft, so when the rotary motor is operated, the pedal plate and the rotation shaft are rotated with respect to the footrest panel.

3. The foldable pedal apparatus of claim 2, wherein the pedal plate, the seat case, and the rotary motor are disposed on an inclined front surface of the footrest panel.

4. The foldable pedal apparatus of claim 3, wherein the seat case is positioned over the rotation shaft.

5. The foldable pedal apparatus of claim 3, wherein a panel hole through which the driven gear is inserted is formed through the front surface of the footrest panel.

6. The foldable pedal apparatus of claim 1, wherein the pedal assembly comprises:
    a pedal housing protruding from a surface of the pedal plate;
    a pedal pad rotatably coupled to the pedal housing at a lower end thereof through a hinge pin and configured to rotate around the hinge pin when being operated by the driver; and
    a return spring having both ends supported by the pedal housing and the pedal pad, respectively, and configured to provide elasticity to the pedal pad so that the pedal pad protrudes from the pedal housing.

7. The foldable pedal apparatus of claim 6, further comprising:
    a permanent magnet coupled to the pedal pad to face the pedal housing; and
    a printed circuit board (PCB) coupled to the pedal housing to face the permanent magnet,
    wherein the PCB recognizes a variation of magnetic flux of the permanent magnet and generates the signal related to the pedal function when the pedal pad is rotated.

8. The foldable pedal apparatus of claim 7, wherein when a rotary motor is rotated and the pedal plate is rotated rearward, the pedal assembly enters the pop-up state in which the pedal assembly is exposed toward the driver, and when the pedal pad is rotated by the driver without the rotary motor in operation and a position of the permanent magnet is changed, the PCB generates the signal related to the pedal function.

9. The foldable pedal apparatus of claim 6, wherein a stopper protrudes at the lower end of the pedal pad.

10. The foldable pedal apparatus of claim 9, wherein the stopper is in contact with the pedal housing in an initial state in which the driver does not operate the pedal pad with the pedal assembly in the pop-up state, so an initial position of the pedal pad is maintained.

11. The foldable pedal apparatus of claim 6, wherein when the driver depresses the pedal pad with the pedal assembly in the pop-up state, a protrusion of the pedal housing comes in contact with an inner side of the pedal pad, so a full stroke position of the pedal pad is maintained.

12. A vehicle comprising the foldable pedal apparatus of claim 1.

13. A foldable pedal apparatus of a vehicle including an autonomous driving mode and a manual driving mode, the foldable pedal apparatus comprising:
- a pedal plate coupled to a footrest panel to be rotatable forward and rearward;
- a pedal assembly disposed at the pedal plate and configured to be rotatable with the pedal plate between a hidden state during the autonomous driving mode and a pop-up state during the manual driving mode, the pedal assembly comprising a first pedal pad and a second pedal pad spaced apart from each other on the pedal plate; and
- a first seat case and a second seat case disposed at the footrest panel and separated from each other, the first and second seat cases configured to receive the first and second pedal pads, respectively, therein when the pedal plate is rotated forward and the pedal assembly reaches the hidden state during the autonomous driving mode.

14. The foldable pedal apparatus of claim 13, wherein one of the first and second pedal pads is an accelerator pedal pad and the other of the first and second pedal pads is a brake pedal pad.

15. The foldable pedal apparatus of claim 13, wherein the first and second pedal pads have the same configuration.

16. A foldable pedal apparatus of a vehicle including an autonomous driving mode and a manual driving mode, the foldable pedal apparatus comprising:
- a pedal plate coupled to a footrest panel to be rotatable forward and rearward;
- a pedal assembly disposed at the pedal plate and configured to be rotatable with the pedal plate between a hidden state during the autonomous driving mode and a pop-up state during the manual driving mode, the pedal assembly configured to generate a signal related to a pedal function when being operated by a driver; and
- a seat case disposed at the footrest panel and configured to receive the pedal assembly inserted into the seat case when the pedal plate is rotated forward and the pedal assembly reaches the hidden state during the autonomous driving mode,
- a cover member made of an elastic material, positioned at an entrance of the seat case, and coupled to the footrest panel at an end, wherein, in a hiding operation of transitioning the pedal assembly from the pop-up state to the hidden state and inserting the pedal assembly into the seat case, the cover member is pressed to be bent into the seat case by the pedal assembly, and in a pop-up operation of transitioning the pedal assembly from the hidden state to the pop-up state and taking the pedal assembly out of the seat case, the cover member returns into an initial shape and blocks the entrance of the seat case, thereby preventing foreign substances from entering the seat case.

17. The foldable pedal apparatus of claim 16, wherein the cover member is a cantilever of which the end is coupled to the footrest panel and a lower end is rotated forward and rearward.

18. The foldable pedal apparatus of claim 17, wherein the cover member is any one of an elastic steel plate and an elastic plastic plate that is formed in the same shape as a cross-section of the entrance of the seat case.

* * * * *